United States Patent Office
2,987,753
Patented June 13, 1961

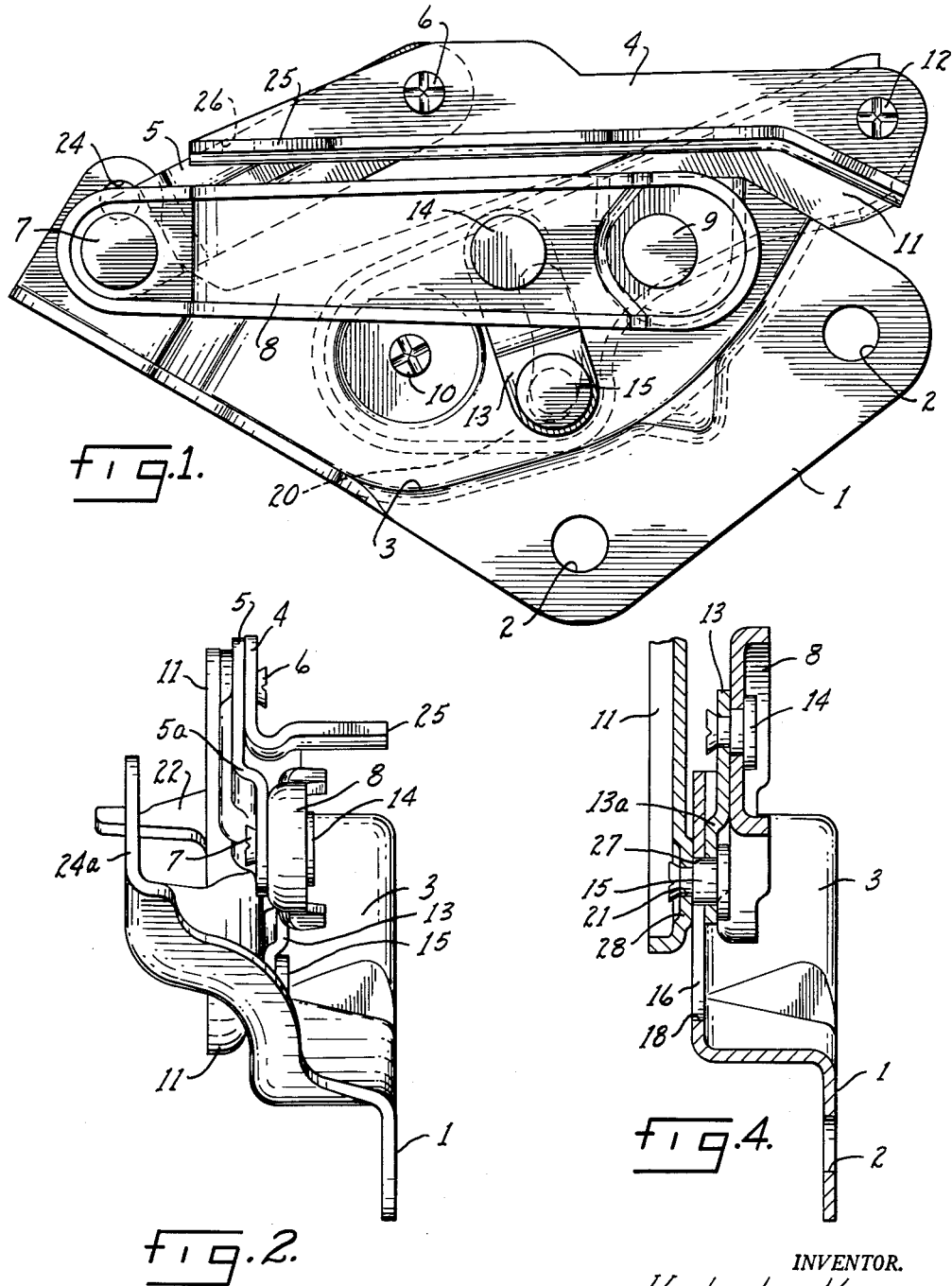

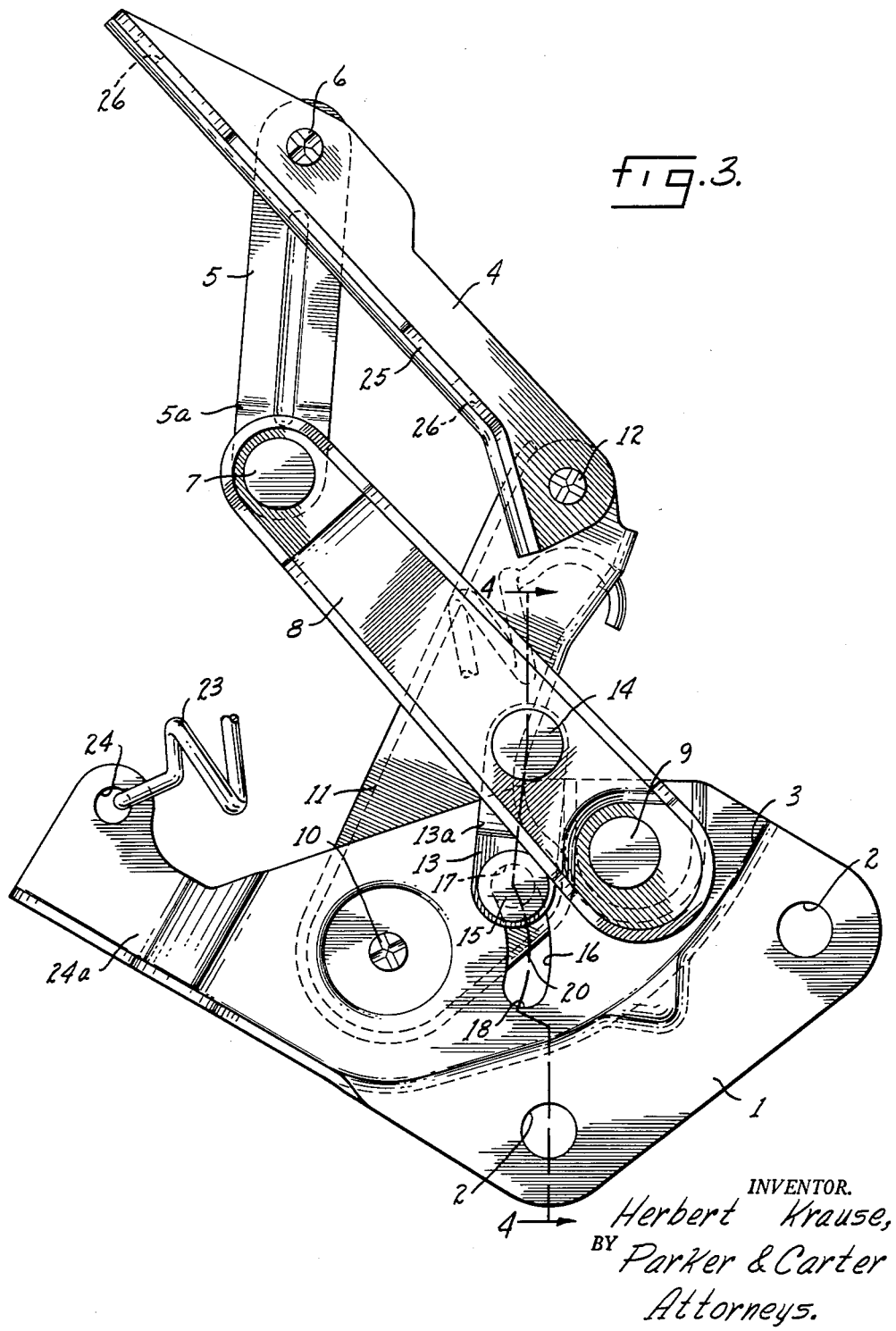

1

2,987,753
HINGE AND SUPPORT ASSEMBLY
Herbert Krause, Chicago, Ill., assignor to Chicago Forging and Manufacturing Company, Chicago, Ill., a corporation of Illinois
Filed Dec. 18, 1959, Ser. No. 860,588
6 Claims. (Cl. 16—128.1)

This invention relates to hinges and has particular relation to a hinge usable, for example, in pivotally supporting and securing the cover of an automobile hood.

One purpose of the invention is to provide a hinge which shall be effective to cause an initial forward movement of the rear edge of a cover supported thereby as the cover is raised.

Another purpose is to provide a hinge having maximum lateral stability and therefore a hinge capable of imparting such maximum lateral stability to the element supported thereby.

Another purpose is to provide a hinge assembly in which the parts thereof may be formed of material having a minimum thickness while continuing to retain maximum inherent lateral stability.

Another purpose is to provide a hinge comprising a plurality of articulated members and a supporting member arranged in an assembly productive of maximum lateral stability.

Another purpose is to form an articulated hinge of a plurality of members and to assemble therewith a supporting plate in a manner effective to provide maximum lateral stability.

Another purpose is to form an articulated hinge structure with an integrated support member so assembled as to permit the employment of material having a minimum thickness while retaining maximum lateral stability.

Other purposes will appear from time to time during the course of the specification and claims.

I illustrate my invention more or less diagrammatically in the accompanying drawings, wherein:

FIGURE 1 is a side view illustrating the hinge of the invention in closed position;

FIGURE 2 is an end view of the structure illustrated in FIGURE 1;

FIGURE 3 is a side elevation illustrating the hinge of the invention in open position; and FIGURE 4 is a detail view in partial cross section taken on the line 4—4 of FIGURE 3.

Like parts are indicated by like numerals throughout the specification and drawings.

Referring now to the drawings, and particularly to FIGURE 1, the numeral 1 generally indicates a mounting plate. The plate 1 has a plurality of apertures 2 suitably arranged for attachment of the plate 1 to the body of the member to be closed, for example to the hood of an automobile. In this regard, while the drawings herein illustrate one hinge, it will be understood that common practice may employ a pair of such hinges arranged in the opposite rear corners of the hood of an automobile for example. Similarly, the plate 1 has an offset rear portion 3, illustrated best in FIGURES 2 and 4, for ease in attachment in a particular installation. It will be understood that the over-all design of plate 1 may take a plurality of individual forms without departing from the nature and scope of the invention.

An elongated cover-attaching or cover-mounting bracket 4 has a link 5 pivotally secured thereto as at 6 adjacent its forward portion, considering the parts as they are shown in the drawings and considering the right hand portion of the drawings as being the rear of the structure illustrated, and corresponding to the location of the rear of an automobile hood to which the hinge of the invention may be attached.

2

The link 5 is pivoted adjacent one of its ends, as at 6, to the bracket 4, and is pivotally connected adjacent its opposite end, as at 7, to a first hinge lever 8 adjacent one end of the latter. The lever 8 is pivotally mounted on plate 1 adjacent the opposite end of lever 8, as at 9, the pivot point 9 being located on plate 1 adjacent a rear portion thereof. The lever 8 is thus pivotally mounted to, and on one side of, plate 1.

Pivotally mounted on plate 1, at a point spaced forwardly thereon from pivot 9, as indicated at 10, is a second hinge lever 11. It will be observed that hinge lever 11 is pivoted to plate 1 on the opposite side thereof from hinge lever 8. The lever 11 is pivotally secured to bracket 4 adjacent the rear portion of said bracket and at the opposite end of lever 11 from pivot 10, as indicated at 12.

A second link 13 is pivoted to lever 8 intermediate the opposite ends of lever 8 and at one end of link 13, as indicated at 14. The link 13 extends from pivot 14 substantially laterally of lever 8 and alongside that side of plate 1 to which lever 8 is pivoted. Carried at the opposite end of link 13 from pivot 14 and extending laterally from link 13 is a pin 15. The pin 15 extends through an arcuate slot 16 formed in the plate 1 between the pivot points 9 and 10. The slot 16 has its opposite ends positioned on opposite sides of a line drawn between pivot points 9 and 10, with its upper end 17, as the parts are shown in the drawings, positioned adjacent such line and its opposite or lower end 18 positioned substantially beneath said line.

The lever 11 has a laterally offset portion 20 formed adjacent the pivot end 10 of lever 11 and extending downwardly from the longitudinal extension of lever 11, as the parts are shown in FIGURE 1. The pin 15 is pivotally secured to the lever segment 20, as shown best in FIGURE 4, at 21.

The lever 11 has a laterally extending ear 22 positioned adjacent its end pivoted as at 12. A yielding means, such as the spring 23, is secured at one of its ends to the ear 22 and at its opposite end to the plate 1 through the employment of a suitable connecting means such as the aperture 24 formed adjacent the forward, offset end of plate 1 opposite to that in which the attaching apertures 2 are formed, the aperture 24 being in alignment with ear 22.

The use and operation of my invention are as follows:

It will be understood that the member to be raised, such as the cover of an automobile hood, is secured to the bracket 4 by any suitable means, the bracket 4 being shown on the drawings as having an angularly disposed ledge 25 having apertures 26 formed therein for reception of suitable attaching means such as bolts and the like. It will be further understood that the cover to be raised is lifted at its forward end or at the end thereof opposite that to which the bracket 4 is connected.

As the member to which bracket 4 is connected is lifted, the action of the hinge of the invention is such as to cause an initial combined forward and upward movement of the rear portion of bracket 4 and hence of the rear edge of the cover to which it is attached, the said movement being effective to prevent impingement of the rear cover edge upon the adjacent portion of the hood.

The spring 23 is under tension at all times and is positioned to and in raising and retaining the cover in open position as indicated best in FIGURE 3.

It will be observed that the link 5 is offset as at 5a, best seen perhaps in FIGURE 2, thus permitting the bracket 4 to lie in a plane between the planes occupied by hinge levers 8 and 11.

It will further be observed that the link 13 is offset intermediate its ends, as indicated at 13a, further to provide for accurate alignment of the articulated members of the hinge of the invention.

As seen perhaps best in FIGURE 4, the hinge levers 8 and 11 are channel-like in cross section. Since the hinge levers 8 and 11 are positioned in back-to-back relationship on the opposite sides of plate 1, a means is provided for the employment of channel shapes in forming the hinge levers 8 and 11. Since the channel shape is known to be of greater strength than the simple plate or strip form of lever, it will be realized that the material of which the levers 8 and 11 are formed may be substantially less in thickness without sacrifice of the required strength in the levers 8 and 11.

With the plate extending between the levers 8 and 11, as indicated best, for example in FIGURE 4, a maximum lateral stability is accomplished by the hinge of the invention. It will be observed best in FIGURE 4 that the portion of link 13 carrying pin 15 and the segment 20 of lever 11, as at 28 on the opposite side of plate 1 from link 13, both bear upon and ride continuously upon the opposite sides of plate 1 adjacent slot 16. Similarly, the lever 11 bears continuously against plate 1 adjacent pivot 10, the link 13 bears (as at 29) continuously against lever 8 adjacent pivot point 14, and lever 8 bears continuously against plate 1 adjacent pivot 9. Thus, lever 11 is in continuous contact with one side of plate 1 at pivot 10 and along slot 16 and lever 8 is in continuous contact with the opposite side of plate 1 at pivot 9 and, through the intermediacy of the offset link 13, along slot 16.

The diameter of pin 15 is substantially equal to the width of slot 16 and the upper end 17 of slot 16 serves as a stop or limit to the upward travel of the hinge of my invention, as best seen in FIGURE 4 at 27.

With the lateral stability achieved by the invention, it will be realized that less concern may be had with respect to close tolerances or clearance limitations upon the pivots 6, 7, 9, 10, 12, 14, and 21.

Whereas I have described and claimed a practical and operative device, nevertheless many changes may be made in size, shape, number and disposition of parts. I therefore wish my description and drawings to be taken as in a broad sense illustrative or diagrammatic, rather than as limiting me to my precise showing.

I claim:

1. In a hinge, a mounting plate, a pair of hinge levers pivotally mounted on opposite sides of said plate, said levers being mounted at spaced points on said plate for pivotal movement in opposite directions, a link member having one of its ends pivotally mounted on one of said levers intermediate the ends of said last-named lever, a pin carried by and laterally extending from said link adjacent the other end of said link, an opening formed in said plate between said spaced pivot points, said pin extending through said opening, the other of said levers being pivotally connected to said pin at a point intermediate the ends of said other lever and on the opposite side of said plate from said link.

2. In a hinge, a bracket, a link pivoted to one end of said bracket, a lever pivoted to said link, a second lever pivoted to the opposite end of said bracket, a mounting plate positioned between said levers and pivotally connected thereto at spaced points on said mounting plate, an aperture formed in said mounting plate between the points at which said levers are pivoted thereto, a second link pivoted to one of said levers and carrying a pin extending through said aperture, said pin being pivotally connected to the other of said levers on the opposite side of said plate from said second link.

3. In a hinge, a bracket, a link pivoted to one end of said bracket, a lever pivoted to said link, a second lever pivoted to the opposite end of said bracket, a mounting plate positioned between said levers and pivotally connected thereto at spaced points on said mounting plate, an arcuate slot formed in said mounting plate between the points at which said levers are pivoted thereto, a second link pivoted to one of said levers and carrying a pin extending through said slot, said pin being pivotally connected to the other of said levers on the opposite side of said plate from said second link, and yielding means connected to said plate and to said second lever and positioned to urge said hinge toward open position.

4. In a hinged assembly a plurality of articulated members and a fixed plate, said articulated members including a pair of channel-shaped hinge levers, said plate being positioned between said levers, said levers being pivoted each adjacent one of its ends to spaced points on said plate, said levers being arranged in back-to-back relationship on opposite sides of said plate, a link pivoted to one of said levers and movable therewith on the side of the plate to which said last-named lever is pivoted, an opening formed in said plate, a pin secured to said link at a point thereon spaced from the point at which said link is pivoted to said last-named lever, said pin extending laterally therefrom through said opening, said pin being pivotally connected to the other of said levers on the opposite side of said plate from said link.

5. The structure of claim 4 wherein said opening is positioned between the points at which said levers are pivoted to said plate.

6. In an articulated hinge a bracket, a link pivotally connected to a forward portion of said bracket, a first lever pivotally connected to a rear portion of said bracket, said link having an offset portion, a second lever pivotally connected at one of its ends to said offset link portion, said second lever being pivotally connected adjacent its opposite end to one side of said plate, said first lever being pivotally connected at its opposite end to the opposite side of said plate, a second link pivotally connected to said second lever and intermediate the ends of said second lever, said second link having an offset portion in contact with said plate, a pin secured to and laterally extending from said offset portion, an arcuate slot in said plate, said pin extending through said slot, said second lever being pivotally connected to said pin on the opposite side of said plate from said second link and having a portion in continuous contact with said opposite side of said plate adjacent said slot throughout the travel of said hinge toward open and closed position.

References Cited in the file of this patent

UNITED STATES PATENTS 2,246,792     Dall     June 24, 1941
2,683,280     Martens     July 13, 1954